United States Patent [19]

Matsumoto

[11] Patent Number: 5,052,716

[45] Date of Patent: Oct. 1, 1991

[54] SHOCK-ABSORBING STEERING COLUMN APPARATUS

[75] Inventor: Sakae Matsumoto, Takasaki, Japan

[73] Assignee: Nippon Seiko Kabushiki Kaisha, Tokyo, Japan

[21] Appl. No.: 528,418

[22] Filed: May 25, 1990

[30] Foreign Application Priority Data

Jun. 19, 1989 [JP] Japan ................ 1-70761[U]

[51] Int. Cl.⁵ .............................. B62D 1/19
[52] U.S. Cl. ................... 280/777; 188/371; 74/492
[58] Field of Search .............. 280/777, 780, 779; 74/492; 188/371

[56] References Cited

U.S. PATENT DOCUMENTS 3,944,244  3/1976  Albrecht .................. 280/777

FOREIGN PATENT DOCUMENTS 2756836  6/1978  Fed. Rep. of Germany ........ 74/492
2821707  11/1978  Fed. Rep. of Germany ...... 280/777

Primary Examiner—Charles A. Marmor
Assistant Examiner—Karin Tyson
Attorney, Agent, or Firm—Shapiro and Shapiro

[57] ABSTRACT

A shock-absorbing steering column apparatus has energy-absorbing members fixedly connected one end to the mounting plates of a column bracket and releasably connected at the other end to corresponding bolts. Each energy-absorbing member is provided with a first U-shaped folded portion in the middle, and an end of the energy-absorbing member is folded by 180° in a direction opposite to the first folded portion to form a second folded portion with a radius of curvature substantially smaller than that of the first folded portion each energy-absorbing member is further provided, at an end closer to the first folded portion than to the second one, with an integral flat plate portion having opposite lateral parts folded toward the first folded portion to form a pair of folded edges which are joined to the surface of the corrresponding mounting plate, so that the first folded portion of the energy-absorbing member is supported between the mounting plate and the flat plate portion.

9 Claims, 3 Drawing Sheets

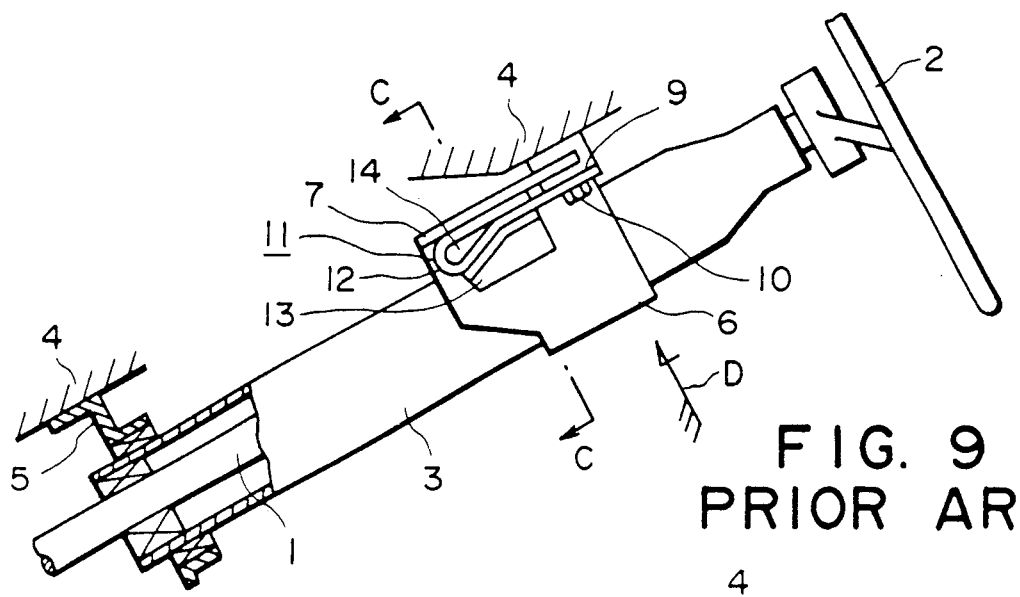
FIG. 9
PRIOR ART
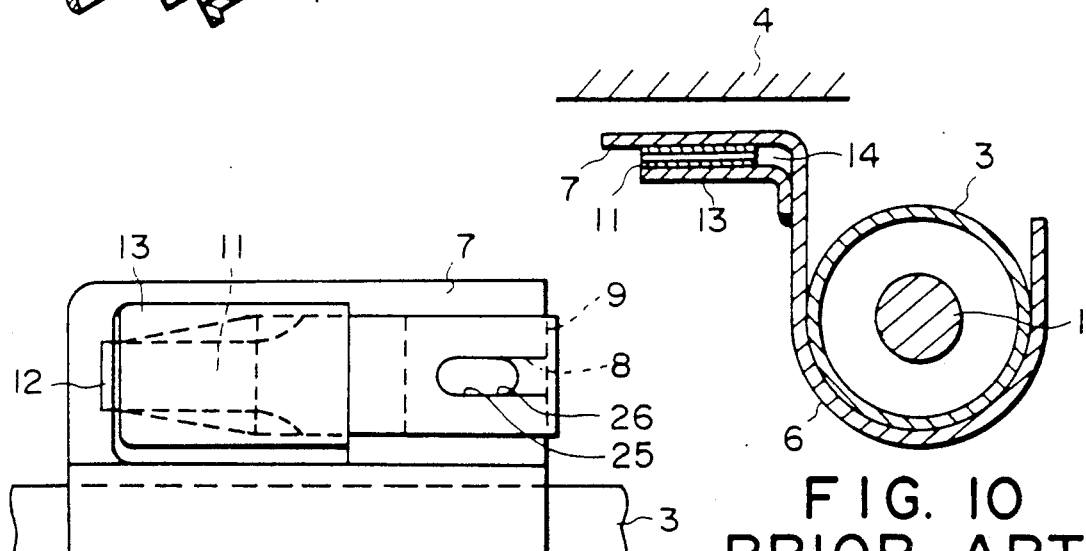
FIG. 10
PRIOR ART
FIG. 11
PRIOR ART
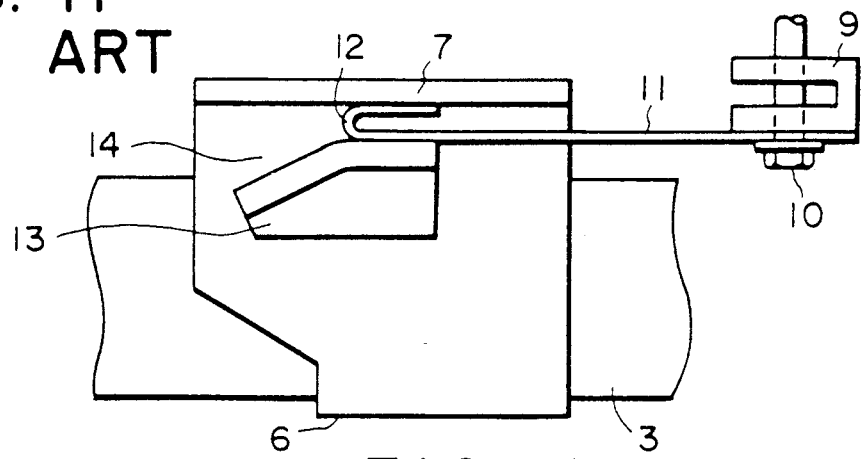
FIG. 12
PRIOR ART 5,052,716

SHOCK-ABSORBING STEERING COLUMN APPARATUS

BACKGROUND OF THE INVENTION

1. Field of the Invention

The present invention relates to a shock-absorbing steering column apparatus which has a structure capable of absorbing the shock of collision in a cylindrical steering column passing through a steering shaft supported for example on a lower face of the dash board of an automobile and constituting the steering apparatus thereof, thereby protecting the life of the passenger at the collision.

2. Related Background Art

At the collision of automobiles, so-called primary collision between the automobiles is often followed by so-called secondary collision in which the driver collides with the steering wheel.

In order to reduce the impact to the driver at such secondary collision and to protect the life of the driver, there has already been employed, as the steering shaft supporting the steering wheel at an end thereof, so called collapsible steering shaft of which the entire length is reducible under the application of a strong impact, and a shock-absorbing structure in the steering column through which the steering shaft passes.

A shock-absorbing steering column used for such purpose is already disclosed for example in the Japanese Laid-Open Utility Model Sho 63—6578.

Such conventional shock-absorbing steering column apparatus are constructed as shown in FIGS. 9 to 12.

Referring to FIG. 9, a steering shaft 1 has a steering wheel 2 at the upper end thereof and is rotated by said steering wheel 2. Said steering shaft 1 has a collapsible structure (not shown) which, upon receiving an axial impact, reduces the entire length while absorbing said impact.

A tubular steering column 3, housing said steering shaft 1 therein, is supported at the middle and at the lower end by a part of the frame 4 of the automobile, such as the lower face of the dash board. More specifically, the lower end of the steering column 3 is axially slidably supported by a bracket 5 fixed in a part of the frame of the automobile.

On the other hand, on the external periphery in the middle of the steering column there is fixed, for example by welding, an upper bracket 6 formed by folding a metal plate. On both sides of said upper bracket 6 there are formed mounting plates 7, for mounting said bracket 6 onto the body 4, having U-shaped notches 8 opening at lateral edges of the mounting plates 7 facing the steering wheel 2.

A fixing member 9, made for example of a plastic material and formed in a square U-shape, is fitted on a lateral edge of said mounting plate 7, so as to cover said notch 8, and a bolt 10 inserted through a hole 25 formed on said fixing member 9 and said notch 8 is screwed into a threaded hole formed in the body 4, whereby said fixing member 9 pinches the mounting plate 7 and fixes said upper bracket 6 to the body of the automobile.

An energy absorbing member 11 is welded, at an end thereof, to the mounting plate 7, and is provided, at the other end, with a hole 26, in which said bolt 10 is inserted. Said energy absorbing member 11, made of a strip-shaped material capable of plastic deformation, is provided, in the middle thereof, with a U-shaped folded portion 12, which is pinched between said mounting plate 7 and a guide plate 13 to be explained in the following.

The guide plate 13, formed by pressing a metal plate, is welded to the lower part of the mounting plates 7 at each side of the upper bracket 6, thereby defining a guide space 14, between the upper face of each guide member 13 and the lower face of each mounting plate 7, for accommodating said folded portion 12 of the energy absorbing member 11.

The shock-absorbing steering column explained above functions in the following manner for protecting the life of the driver, at a collision of the automobile.

An impact applied to the steering wheel resulting from the secondary collision in an accident is immediately transmitted to the steering column 3, thus strongly pushing the steering column 3 in the axial direction thereof.

When the axial impact applied to the steering column 3 exceeds the friction between said mounting plates 7 and the fixing members 9, the bolts 10 are disengaged from the notches 8 formed in said mounting plates 7, whereby the steering column 3 becomes capable of displacement.

As a result, the steering column 3 moves axially to the front (towards lower left in FIG. 9) by said impact, thus stretching the energy absorbing member 11 as shown in FIG. 12. In the course of stretching of said member 11 from a state shown in FIG. 9 to a state in FIG. 12, the folded portion 12 formed in the middle of said member 11 moves from an end connected to the bolt 10 to the other end connected to the mounting plate 7 (from right to left in FIG. 12).

In said movement, each portion of the energy-absorbing member 11 performs plastic deformation, absorbing the impact applied from the body of the driver to the steering column 3 through the steering wheel 2. In the illustrated example, a part of the upper face of the guide member 13 is inclined, in such a manner that the height of the guide space 14 accommodating the folded portion 12 of the energy-absorbing member 11 gradually decreases, whereby said member 11 absorbs progressively increasing impact and achieves effective impact absorption.

However, the above-explained conventional shock-absorbing steering column inevitably requires complex assembling operations, because of the large number of component parts involved.

More specifically, in the above-explained conventional structure, ends of the energy-absorbing members 11 are welded to the mounting plates 7 of the upper bracket 6, and the guide plates 13 are also welded to said upper bracket 6. Such separate welding operations of different parts to the upper bracket 6 complicate the administration of parts and the assembling operations, thereby inevitably increasing the manufacturing cost of the shock-absorbing steering column.

SUMMARY OF THE INVENTION

The object of the present invention is to provide a shock-absorbing steering column apparatus of reduced manufacturing cost.

The shock-absorbing steering column apparatus of the present invention comprises, a steering column in which passes a steering shaft having a steering wheel at an end thereof as in the above-explained conventional apparatus, a supporting bracket having mounting plates for mounting on the body of an automobile and fixed on the outer periphery of said steering column, notches formed in a lateral edge of each of said mounting plates, bolts passing through said notches and screwed into threaded holes provided on the body thereby fixing said bracket to the body, and energy-absorbing members each unseparably connected, at an end thereof, to said mounting plate and at the other end to said bolt and having a first U-shaped folded portion in the middle.

Furthermore, in the apparatus of the present invention, an end of said energy-absorbing member is folded by 180° in a direction opposite to that of said first folded portion, thereby forming a second folded portion of a radius of curvature substantially smaller than that of said first folded portion, and a flat plate portion is integrally formed with said energy-absorbing member at the front edge thereof positioned closer to said first folded portion than to said second folded portion and is folded at the lateral edges toward said first folded portion to form a pair of folded edges, which are fixed to the surface of said mounting plate, whereby the first folded portion of said energy-absorbing member is supported between said mounting plate and said flat plate portion.

The function of the above-explained shock-absorbing steering column apparatus of the present invention, for protecting the driver by absorbing the impact energy of the secondary collision at an accident, is basically the same as in the conventional apparatus explained before. In an accident, said impact energy is absorbed by the displacement of said first folded portion, positioned between the flat plate portion integrally formed with the energy-absorbing member and the mounting plate of the bracket.

However, in the apparatus of the present invention, the energy-absorbing structure with the energy-absorbing member can be obtained by simply fixing, for example by welding, the folded edges formed on lateral edges of said flat plate portion to said mounting plate, without the use of a separate guide plate. Thus it is possible to reduce the work for administration of component parts and for manufacture, and to reduce the manufacturing cost of the shock-absorbing steering column apparatus.

BRIEF DESCRIPTION OF THE DRAWINGS

FIGS. 1 to 4 illustrate a first embodiment of the present invention, wherein FIG. 1 is a lateral view of the entire structure, FIG. 2 is a partial view 25 seen in a direction A shown in FIG. 1, FIG. 3 is a cross-sectional view along a line B—B in FIG. 1, and FIG. 4 is a perspective view of an energy-absorbing member;

FIGS. 6 and 7 illustrate a third embodiment of the present invention, wherein FIG. 6 is a lateral view similar to FIG. 5, and FIG. 7 is a perspective view of an energy-absorbing member;

FIG. 9 is a lateral view of a conventional shock-absorbing steering column apparatus;

FIG. 10 is a cross-sectional view along a line C—C in FIG. 9;

FIG. 11 is a partial view seen in a direction D in FIG. 9; and

FIG. 12 is a cross-sectional view showing a state after shock absorption in a collision, corresponding to the central portion in FIG. 9.

DESCRIPTION OF THE PREFERRED EMBODIMENTS

Now the present invention will be described in greater detail, with reference to the exemplary embodiments shown in the attached drawings.

Figure 1:
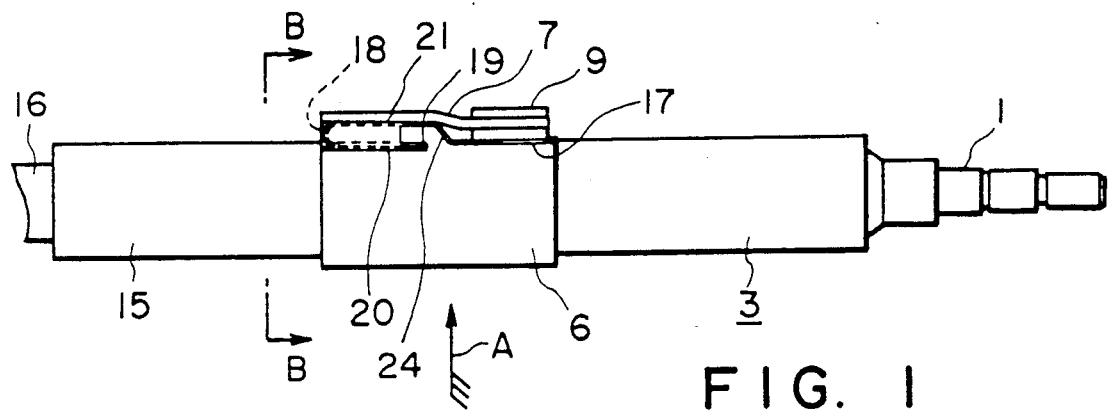
Figure 2:
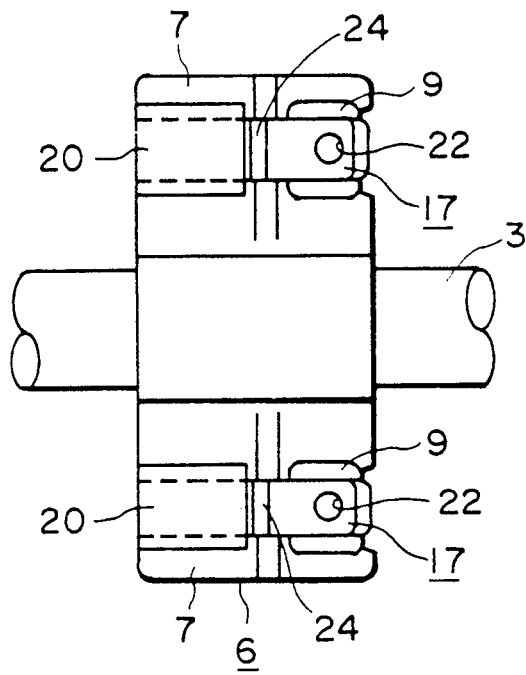
Figure 3:
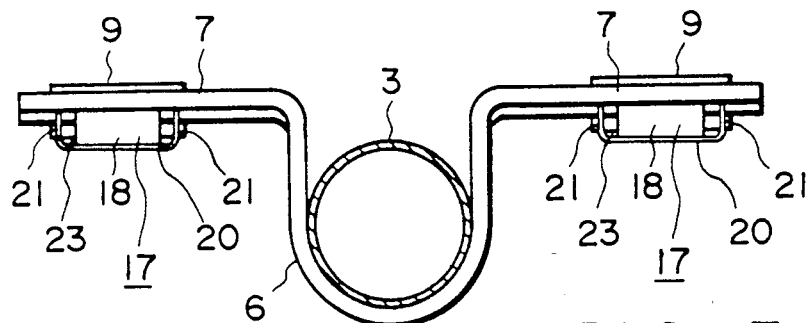
Figure 4:
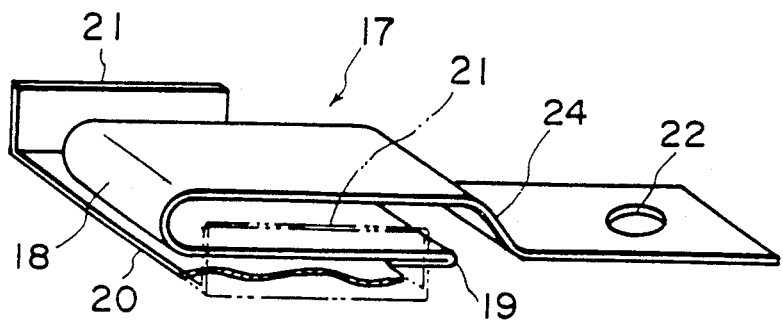

FIGS. 1 to 4 illustrate a first embodiment of the present invention, wherein FIG. 1 is a lateral view of the entire structure, FIG. 2 is a partial view seen in a direction A in FIG. 1, FIG. 3 is a cross-sectional view along a line B—B in FIG. 1, and FIG. 4 is a perspective view of an energy-absorbing member.

Inside a steering column 3, there is rotatably inserted a steering shaft 1 which is provided at an end thereof (right end in FIG. 1) with a steering wheel 2 (not shown in FIG. 1; see FIG. 9).

In the intermediate part of said steering column 3, there is fixed, by welding, an upper support bracket 6 having mounting plates 7, 7 on both sides, for mounting to the body of the automobile. In the illustrated embodiment, the steering column 3 is of so-called collapsible type, consisting of an outer column 15 and an inner column 16 combined in a telescopic structure. Consequently, the lower bracket (not shown in FIG. 1), used for fixing the lower end of the inner column 16 to the body, need not be of a structure allowing axial displacement of said column, as in the case of conventional structure shown in FIG. 9.

Each of the mounting plates 7, 7 of said upper bracket 6 is provided, at a lateral edge thereof (right-hand edge in FIGS. 1 and 2), with a notch 8 (cf. FIG. 11), and is fitted with an engaging member 9 so as to cover said notch 8. Each of the engaging members 9, 9 is provided with a circular hole for passing an aforementioned bolt 10 (cf. FIG. 9).

Associated with each mounting plate is an energy-absorbing member 17 made of a strip-shaped material capable of plastic deformation and constructed as shown in FIG. 4.

In the middle of the energy-absorbing member 17 there is formed a first U-shaped folded portion 18, and an end of said member 17 is folded further by 180° in a direction opposite to said first folded portion, thereby forming a second folded portion 19 with a radius of curvature substantially smaller than that of the first folded portion (i.e., a substantially narrower U-shape). At an end closer to said second folded portion than to the first folded portion, there is formed a flat plate portion 20 integral with the energy-absorbing member 17 having said first and second folded portions 18, 19, and both lateral edges of said flat plate portion 20 are bent rectangularly toward said first folded portion 18 (upwards in FIG. 4) to form a pair of folded edges 21, 21. At the other end of said energy-absorbing member 17, there is formed a circular hole 22 for passing the corresponding said bolt 10 (cf. FIG. 9).

The above-explained energy-absorbing member 17 is fixed, at the first-mentioned end thereof, to the lower face of the mounting plate 7, by welding of the folded edges 21, 21, formed on both lateral ends of the flat plate portion 20 at the end of said energy-absorbing member 17, to the lower face of the mounting plate 7 of the upper bracket 6.

In the above-explained state in which an end of the energy-absorbing member 17 is fixed to the lower face of the mounting plate 7, the first folded portion 18 of said member 17 is sandwiched between said mounting plate 7 and the flat plate portion 20.

Additionally, the other end of said energy-absorbing member 17 is inseparably connected to the bolt 10 inserted into the circular hole 22. Said bolt 10 further passes through the notch 8 formed in the mounting plate 7 and the circular hole formed in the engaging member 9 fitted on each mounting plate 7 so as to cover said notch 8, and is screwed into a threaded hole formed on a lower face of the body 4 (cf. FIG. 9).

The function of the above-explained shock-absorbing steering column apparatus of the present invention, for protecting the life of the driver by absorbing the impact energy of the secondary collision in an accident, is basically same as that in the conventional apparatus explained above.

More specifically, in an accident, an impact is applied to the steering wheel 2 (FIG. 9) by so-called secondary collision, to push the steering column 3 in the axial direction. When the axial impact on the steering column 3 exceeds the friction between the mounting plates 7, 7 and the engaging members 9, 9, the bolts 10 escape the notches 8 formed in the mounting plates 7, and the steering column 3 moves axially frontward (left in FIG. 1) by said impact, stretching the energy-absorbing members 17.

Said stretching of the energy-absorbing member 17 causes the first folded portion 18, formed in the middle of said member 17, to displace in a guide space 23 defined between the flat plate portion 20 integral with said member 17 and the mounting plate 7 of the upper bracket 6 (first folded portion 18 displacing toward the second folded portion 19).

The plastic deformation of the energy-absorbing members 17, 17 resulting from the displacement of the first folded portions 18, 18 absorbs the impact energy caused by said secondary collision, thus preventing the body of the driver from serious injury.

In the illustrated embodiment, the energy-absorbing member 17 is further provided, between said first folded portion 18 and the circular hole 22 at an end, with a stepped portion 24, which is stretched before the start of displacement of the first folded portion 18 in case of the movement of the steering column resulting from the secondary collision.

Consequently, the impact energy is absorbed in two steps with a time gap therebetween, whereby the driver is more effectively protected from the major impact in a period before the engaging members 9, 9 escape the mounting plates 7, 7.

The impact absorbing effect explained above is basically same as that in the aforementioned conventional apparatus except for the advantageous additional impact absorption by the stepped portions 24. From a manufacturing point of view, the apparatus of the present invention is especially advantageous in that the impact-absorbing structure consisting of the energy-absorbing members 17 and the upper bracket 6 can be obtained by simply welding (or bolt-fixing) the folded edges 21, 21 on both lateral edges of the flat plate portions 20 integral with the energy-absorbing members 17 to the mounting plates 7, 7 of said upper bracket 6.

Therefore, in contrast to the conventional structure, it is no longer necessary to provide a separate guide plate 13 and to weld it to the mounting plate. The invention thus simplifies the work of parts administration and the process of manufacture, thereby reducing the cost of the shock-absorbing steering column apparatus.

Figure 5:
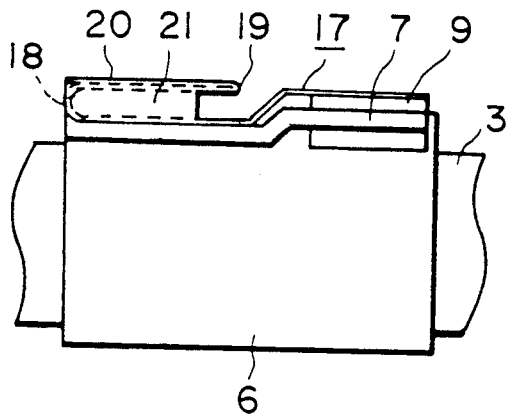
FIG. 5 is a lateral view of a second embodiment of the present invention, corresponding to the central part in FIG. 1.

FIG. 5 shows a second embodiment of the present invention.

In contrast to the first embodiment (in which the folded edges 21, 21 formed on both sides of the flat plate portion 20 provided at an end of the energy-absorbing member 17 are welded in abutting relation to the lower face of each mounting plate 7), the present embodiment is characterized in that said folded edges 21, 21 are welded in abutting relation to the upper face of said mounting plate 7, so that the other end of the energy-absorbing member 17 is supported between the upper face of said engaging member 9 and the lower face of the body 4 (FIG. 9).

Other structures and functions are same as those in the foregoing first embodiment, so that equivalent components are indicated by the same numbers as those in said first embodiment and will not be explained further.

Figure 6:
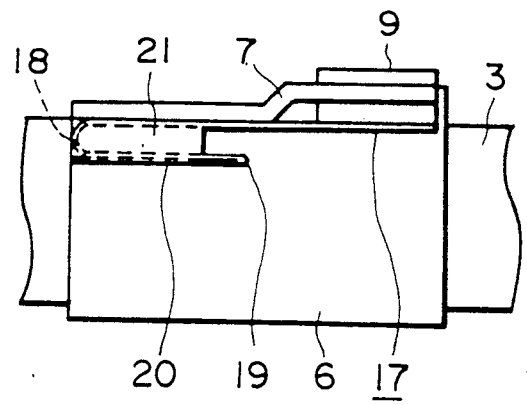
Figure 7:
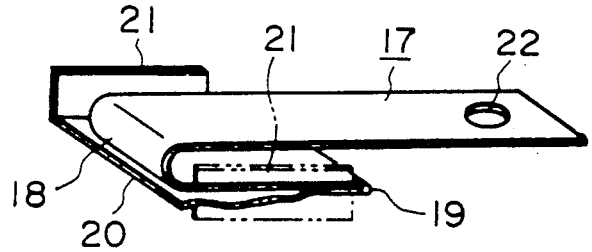

FIGS. 6 and 7 illustrate a third embodiment of the present invention.

In this embodiment, there is omitted the stepped portion 24 provided in the energy-absorbing member 17 between the first folded portion 18 in the middle and the circular hole at an end of said member 17 (see FIGS. 1, 2 and 4). Consequently, the impact absorption is not conducted in two steps, but the shock-absorbing mechanism can be formed, as in the foregoing embodiments, by merely welding the folded edges 21, 21 formed on both sides of the flat plate portion 20 provided integrally with the energy-absorbing member 17 to each mounting plate 7 of the upper bracket 6.

Figure 8:
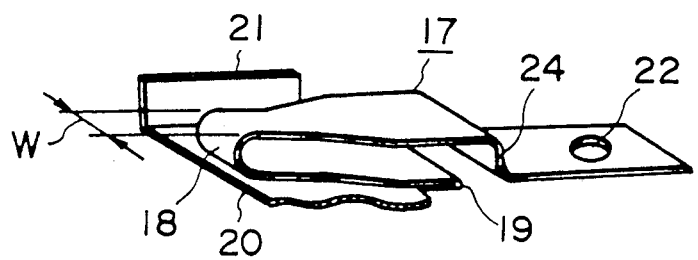
FIG. 8 is a perspective view of an energy-absorbing member in a fourth embodiment of the present invention.

FIG. 8 shows a fourth embodiment of the present invention.

In this embodiment, the width W of the plate material constituting the energy-absorbing member 17 increases gradually from the first folded portion 18 toward the other end. In the displacement of the steering column 3 by the secondary collision, the force required for displacing the first folded portion 18 toward the second folded portion 19 increases with the increase of width of the material at the position of the first folded portion 18. Consequently, in the impact-absorbing mechanism constructed with the energy-absorbing member 17 shown in FIG. 8, the impact energy absorbed by said member 17 increases progressively with the proceeding of displacement of the first folded portion 18, thereby achieving effective impact absorption.

As explained in the foregoing, the shock-absorbing steering column apparatus of the present invention enables easy assembling and easy administration of component parts due to the reduced number thereof, and thus reduces the cost of said apparatus.

What is claimed is:

1. A shock-absorbing steering column apparatus, comprising a steering column in which passes a steering shaft having a steering wheel at an end thereof; a supporting bracket provided with fixed mounting plates for attachment to the body of an automobile; notches formed on respective lateral edges of said mounting plates; bolts inserted through said notches and secured in corresponding holes formed in the body of the automobile, thereby fixing said supporting bracket to said body; and energy-absorbing members each unseparably fixed at an end to a corresponding one of said mounting plates and at another end to a corresponding one of said bolts and provided with an intermediate first U-shaped folded portion, wherein an end of each of said energy-absorbing members is folded by 180° in a direction opposite to said first folded portion, thereby forming a second folded portion with a radius of curvature substantially smaller than that of said first folded portion, and said energy-absorbing member is provided, at an end thereof closer to said second folded portion than to said first folded portion, with an integral flat plate portion, of which both lateral portions are folded toward said first folded portion to constitute a pair of folded edges which are joined to a surface of said mounting plate, whereby the first folded portion of said energy-absorbing member is maintained between said mounting plate and said flat plate portion.

2. An apparatus according to claim 1, wherein a width of a plate material constituting said energy-absorbing member increases progressively from said first folded portion toward said another end.

3. An apparatus according to claim 1, wherein said energy-absorbing member is provided, between said first folded portion and said another end, with a step-shaped portion.

4. An apparatus according to claim 2, wherein said energy-absorbing member is provided, between said first folded portion and said another end, with a step-shaped portion.

5. A shock-absorbing steering column apparatus, comprising a steering column in which passes a steering shaft having a steering wheel at an end thereof; a supporting bracket supporting said steering column and having a pair of mounting plates releasably secured to an automobile body; and a pair of energy absorbing members each associated with a corresponding said mounting plate; each energy-absorbing member having a first end portion secured to said automobile body, a second end portion secured to the corresponding mounting plate, an intermediate first U-shaped folded portion, and a second U-shaped folded portion between said second end portion and said first folded portion and folded into a substantially narrower U-shape than said first folded portion and in an opposite direction to said first folded portion, said second end portion having an integral plate portion with opposite sides bent toward the corresponding mounting plate and joined thereto, whereby said first folded portion is confined between the corresponding mounting plate and said plate portion.

6. An apparatus according to claim 5, wherein each mounting plate is releasably secured to said automobile body by a fixing member secured to said automobile body by bolt means passing through a notch formed in a lateral edge of said mounting plate.

7. An apparatus according to claim 5, wherein each energy-absorbing member includes a portion between said first folded portion and said first end portion and having a width which increases progressively toward said first end portion.

8. An apparatus according to claim 6, wherein each said energy-absorbing member has a step-shaped portion between said first folded portion and said first end portion.

9. An apparatus according to claim 5, wherein each said energy-absorbing member has a step-shaped portion between said first folded portion and said first end portion.

* * * * *